US010031714B2

(12) United States Patent
Cheng (10) Patent No.: US 10,031,714 B2
(45) Date of Patent: Jul. 24, 2018

(54) METHOD AND DEVICE FOR PROCESSING AUDIO FILES (71) Applicant: Guangdong Oppo Mobile Telecommunications Corp., Ltd., Dongguan, Guangdong (CN)

(72) Inventor: Sheng Cheng, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 15/372,043

(22) Filed: Dec. 7, 2016

(65) Prior Publication Data

US 2017/0090855 A1 Mar. 30, 2017

Related U.S. Application Data (63) Continuation of application No. PCT/CN2016/074911, filed on Feb. 29, 2016.

(30) Foreign Application Priority Data

Mar. 20, 2015 (CN) .......................... 2015 1 0124957

(51) Int. Cl.
G06F 17/00 (2006.01)
G06F 3/16 (2006.01)
G06F 17/30 (2006.01)
(52) U.S. Cl.
CPC .......... *G06F 3/16* (2013.01); *G06F 17/30743* (2013.01)
(58) Field of Classification Search
CPC .... G06F 3/16; G06F 3/4242; G06F 17/30743; G06F 17/30843; G10H 2210/101;
(Continued)

(56) References Cited

U.S. PATENT DOCUMENTS 7,319,185 B1 * 1/2008 Wieder ................ G10H 1/0041
84/609
2001/0039872 A1 * 11/2001 Cliff ..................... G10H 1/0033
84/609
(Continued)

FOREIGN PATENT DOCUMENTS

CN 1985302 A 6/2007
CN 101221762 7/2008
(Continued)

OTHER PUBLICATIONS

Jun Zhou et al., "On the Cutting Technique of Animation, Movie, and Music, Film Literature", Dec. 31, 2011, pp. 51-52, issue 12, China.

(Continued)

*Primary Examiner* — Andrew C Flanders
(74) *Attorney, Agent, or Firm* — Young Basile Hanlon & MacFarlane, P.C.

(57) ABSTRACT

The present disclosure provides a method and device for processing audio files. The method can include the follows. A setting instruction from a user is received. Preset styles of spliced songs are set in accordance with the setting instruction. N pieces of audio files are read out and analyzed to obtain styles thereof. The start time and the end time of each paragraph corresponding to each of the styles of the N pieces of audio files are determined. The N pieces of audio files are clipped in accordance with the start time and the end time determined, so as to obtain K pieces of clipped paragraph, and all or part of the K pieces of clipped paragraph are spliced in accordance with the order of the preset styles to obtain audio files of the spliced songs; wherein N, K≥1 and are integers.

11 Claims, 9 Drawing Sheets (58) Field of Classification Search
CPC ....... G10H 2210/105; G10H 2210/111; G10H 2210/125; G10H 2210/131; G10H 2210/136; G10H 2210/141; G10H 2210/145; G10H 2210/151; G10H 2210/341; G10H 2210/346; G10H 2210/351; G10H 2210/361; G10H 2210/366; G10H 2210/371; G10H 2240/121; G10H 2240/125; G10H 2240/131; G10H 2240/135; G10H 2240/141; G10H 2240/145; G10H 2240/325; G10H 1/0025; G10H 2210/375; G10H 2210/385; G10H 2210/391

See application file for complete search history.

(56) References Cited

U.S. PATENT DOCUMENTS

| | | | | |
|---|---|---|---|---|
| 2003/0212466 | A1* | 11/2003 | Alferness | G10H 1/0058 700/94 |
| 2005/0144016 | A1* | 6/2005 | Hewitt | G11B 27/034 704/278 |
| 2008/0314232 | A1* | 12/2008 | Hansson | G11B 27/038 84/625 |
| 2009/0019995 | A1* | 1/2009 | Miyajima | G10H 1/0025 84/625 |
| 2009/0088877 | A1* | 4/2009 | Terauchi | G10H 1/0025 700/94 |
| 2009/0272253 | A1* | 11/2009 | Yamashita | G10H 1/0025 84/611 |
| 2011/0112672 | A1* | 5/2011 | Brown | G10H 1/0025 700/94 |
| 2012/0197650 | A1 | 8/2012 | Resch et al. | |
| 2014/0018947 | A1* | 1/2014 | Ales | G11B 20/10 700/94 |
| 2014/0052282 | A1* | 2/2014 | Balassanian | G06F 17/30778 700/94 |
| 2015/0081064 | A1* | 3/2015 | Ball | G06F 17/3074 700/94 |

FOREIGN PATENT DOCUMENTS

| | | |
|---|---|---|
| CN | 101398827 A | 4/2009 |
| CN | 201243308 Y | 5/2009 |
| CN | 101520808 A | 9/2009 |
| CN | 101548257 A | 9/2009 |
| CN | 101587708 A | 11/2009 |
| CN | 103186527 A | 7/2013 |
| CN | 103400593 A | 11/2013 |
| CN | 104778216 A | 7/2015 |
| CN | 104778219 A | 7/2015 |
| EP | 1855216 A2 | 11/2007 |
| JP | 2000039892 A | 2/2000 |

OTHER PUBLICATIONS

Jing Hu, "Flash production material, "cutting processing technology." Informationization of China Education", Dec. 31, 2007, pp. 68-69, issue 12, China.

Extended European Search Report issued in corresponding European application No. 16767652.7 dated Feb. 12, 2018.

* cited by examiner

METHOD AND DEVICE FOR PROCESSING AUDIO FILES

CROSS-REFERENCE TO RELATED APPLICATIONS

This application is a continuation of International Application No. PCT/CN2016/074911, filed on Feb. 29, 2016, which claims priority to Chinese patent application No.201510124957.1, filed on Mar. 20, 2015, the disclosures of both of which are herein incorporated by reference in their entireties.

TECHNICAL FIELD

The present disclosure relates to the field of audio processing technology, and particularly to a method and device for processing audio files.

BACKGROUND

With the rapid development of mobile Internet technology, the demand for music playing of devices such as mobile phones, tablet PCs, touch-screen computers, and other dedicated players is increasing high. Currently, in the related art, improvement of playing function is generally realized through sound quality processing, for example, inferior audio files can be processed properly via processing software provided in a device or a dedicated player so as to improve playing quality. On the other hand, playing quality depends on the quality of audio files per se and for instance, genuine audio files can provide the user with better playing effect.

Through clipping, extracting, and other operations performed on parts of audio files, playing quality can be improved either.

SUMMARY

Disclosed herein are implementations of a method for processing audio files, comprising receiving a setting instruction from a user, setting preset styles of spliced songs in accordance with the setting instruction, reading out N pieces of audio files, wherein N≥1 and is an integer, analyzing the N pieces of audio files to obtain styles of the N pieces of audio files, determining a start time and an end time of a paragraph corresponding to each of the styles of the N pieces of audio files, clipping the N pieces of audio files in accordance with the start time and the end time of the paragraph corresponding to each of the styles of the N pieces of audio files to obtain K pieces of clipped paragraph, wherein K≥1 and is an integer, and splicing all or part of the K pieces of clipped paragraph in accordance with an order of the preset styles to obtain spliced audio files of the spliced songs.

Disclosed herein are also implementations of a device for processing audio files, comprising a receiving unit, configured to receive a setting instruction from a user, a setting unit, configured to set preset styles of spliced songs in accordance with the setting instruction, a reading unit, configured to read out N pieces of audio files, wherein N≥1 and is an integer, an analyzing unit, configured to analyze the N pieces of audio files to obtain styles of the N pieces of audio files, a first determining unit, configured to determine a start time and an end time of a paragraph corresponding to each of the styles of the N pieces of audio files, a clipping unit, configured to clip the N pieces of audio files in accordance with the start time and the end time of the paragraph corresponding to each of the styles of the N pieces of audio files to obtain K pieces of clipped paragraph, wherein K≥1 and is an integer, and a splicing unit, configured to splice all or part of the K pieces of clipped paragraph in accordance with an order of the preset styles to obtain spliced audio files of the spliced songs.

Disclosed herein are also implementations of a method for processing audio files, comprising reading out at least one audio file, analyzing the at least one audio file to obtain styles of paragraphs of the at least one audio file, determining a start time and an end time of at least one paragraph when a style of the at least one paragraph belongs to preset styles, clipping the at least one audio file in accordance with the start time and the end time of the at least one paragraph to obtain at least one clipped paragraph, and splicing the at least one clipped paragraph to obtain spliced audio files.

BRIEF DESCRIPTION OF THE DRAWINGS

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

DETAILED DESCRIPTION

Technical schemes of the present disclosure will be described clearly and completely combined with the accompanying drawings and obviously, implementations illustrated below is only a part rather than all of the implementations of the present disclosure. All other implementations obtained based on those illustrated herein without creative work shall fall into the protective scope of the present disclosure.

"Device" referred to herein includes but not limited to laptops, smart phones, tablet PCs, Intelligent wearable devices, players, MP3, MP4, Intelligent TVs, set-top boxes, servers, and the like. "Device system" or "system of a device" refers to an operating system (OS), which can include but not limited to Android OS, Symbian OS, Windows OS, IOS, and other systems. In addition, "Android device" is a device provided with an Android system, and similarly, "Symbian device" is a device provided with a Symbian system. Examples given above are not exhaustive and other devices or systems can be used either.

"Song" referred to herein includes but not limited to Chinese songs, English songs, Russian songs, Spanish songs, Classical songs, pop music, rock music, light music, raps, cappella songs, songs in a video, and the like. Examples given above are not exhaustive.

The format of songs includes but not limited to MP3, MP4, WMV, WAV, FLV, and the like. Examples given above are illustrative rather than exhaustive.

In the related art, clipping of songs relies primarily on network software which often requires manual operation and cannot determine the exact location of each sentence of a song accurately. Take this into consideration, the present disclosure provides a technical scheme which can clip and splice audio files automatically according to preset styles, therefore, the user does not have to do clipping or splicing manually.

Implementations of the present disclosure relate to a method and device for processing audio files, which will be described below with refer to FIG. 1A-FIG. 8.

First Method Implementation

Figure 1A:
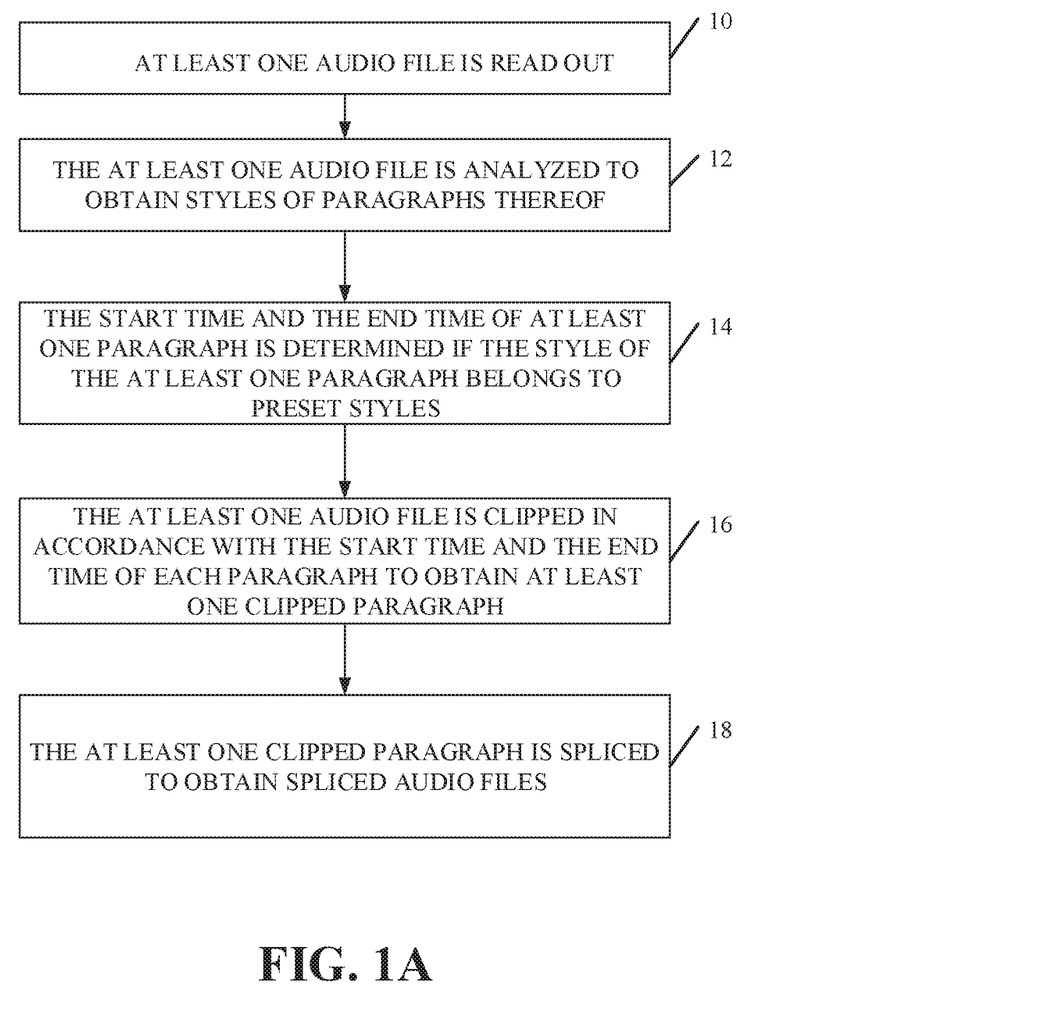
FIG. 1A is a schematic flow chart illustrating a method for processing audio files according to a first method implementation of the present disclosure.

FIG. 1A is a schematic flow chart illustrating a method for processing audio files according to the first implementation of the present disclosure. As illustrated in FIG. 1A, the method can begin at block 10.

At block 10, at least one audio file is read out. The quantity of the at least one audio file can be arbitrary or can be set by system or by user according to actual needs. There is no restriction on this. For example, the at least one audio file can be pre-selected in accordance with preset styles at the first place so as to simply subsequent operations.

At block 12, the at least one audio file is analyzed to obtain styles of paragraphs thereof. In practice, an audio file can be composed of a plurality of paragraphs while each paragraph can be composed of a plurality of sentences.

At block 14, the start time and the end time of at least one paragraph is determined if the style of the at least one paragraph belongs to preset styles.

"Style" or "preset style" referred to herein can include but not limited to light music, rock music, heavy metal music, fresh music, folk music, rap, Chinese music, English music, vocal music, choral music, country music, and the like. Moreover, the preset styles can be set and sent to system side via an instruction by user. Or, the preset styles can be set by the system side directly according to system settings or the habits of the user.

As one implementation, the start time and the end time of at least one sentence instead of at least one paragraph can be determined either, and in such a situation, higher accuracy can be achieved.

At block 16, the at least one audio file is clipped in accordance with the start time and the end time of each paragraph to obtain at least one clipped paragraph.

Through the process at block 16, at least one clipped paragraph can be obtained. It can be comprehended that, suppose an audio file contains only one style and the style belongs to the preset styles either, in this case, only one clipped paragraph is obtained and it is the complete audio file.

At block 18, the at least one clipped paragraph is spliced to obtain spliced audio files.

Here, splicing of audio files can be conducted in different splice orders. For example, the audio files can be spliced in accordance with the sequence of input of each of the preset styles if the preset styles are provided by user; or, the audio files can be spliced in a random order; otherwise, the audio files can be spliced in accordance with a order indicated by user, for example, indicated together with the preset styles per se via an instruction sent by user. For instance, the order can be any of the follows: the first song is rock music and the second song is rap; the first sentence is Chinese music and the second sentence is English music; or, the first paragraph is rap and the second paragraph is vocal music; and so on.

As one implementation, instead of conduct style matching at block 14, the style matching can be performed at the first place. For example, at block 10, the at least one audio file can be read out according to the preset styles, in other words, an audio file will be read out only if the style thereof belonging to the preset styles, and in this case, at block 14, the start time and the end time of all paragraphs of the audio file will be determined since the style(s) of the audio file is a preset style(s).

As another example, the method for processing audio files can be completed as follows: at least one audio file is read out; the at least one audio file is analyzed to obtain styles of paragraphs thereof; the start time and the end time of all the paragraphs is determined; the at least one audio file is clipped in accordance with the start time and the end time of each paragraph to obtain at least one clipped paragraph; one or more clipped paragraphs of the at least one clipped paragraphs are spliced to obtain spliced audio files, among which the one or more clipped paragraphs have a style matched with the preset styles. That is to say, other paragraphs of the at least one clipped paragraphs, which style does not match with the preset styles, will not be spliced. Compared with the method described with reference to FIG. 1A, in this implementation, the style matching is conducted at the last step instead of being performed prior to determine the start time and the end time.

Second Method Implementation

Figure 1B:
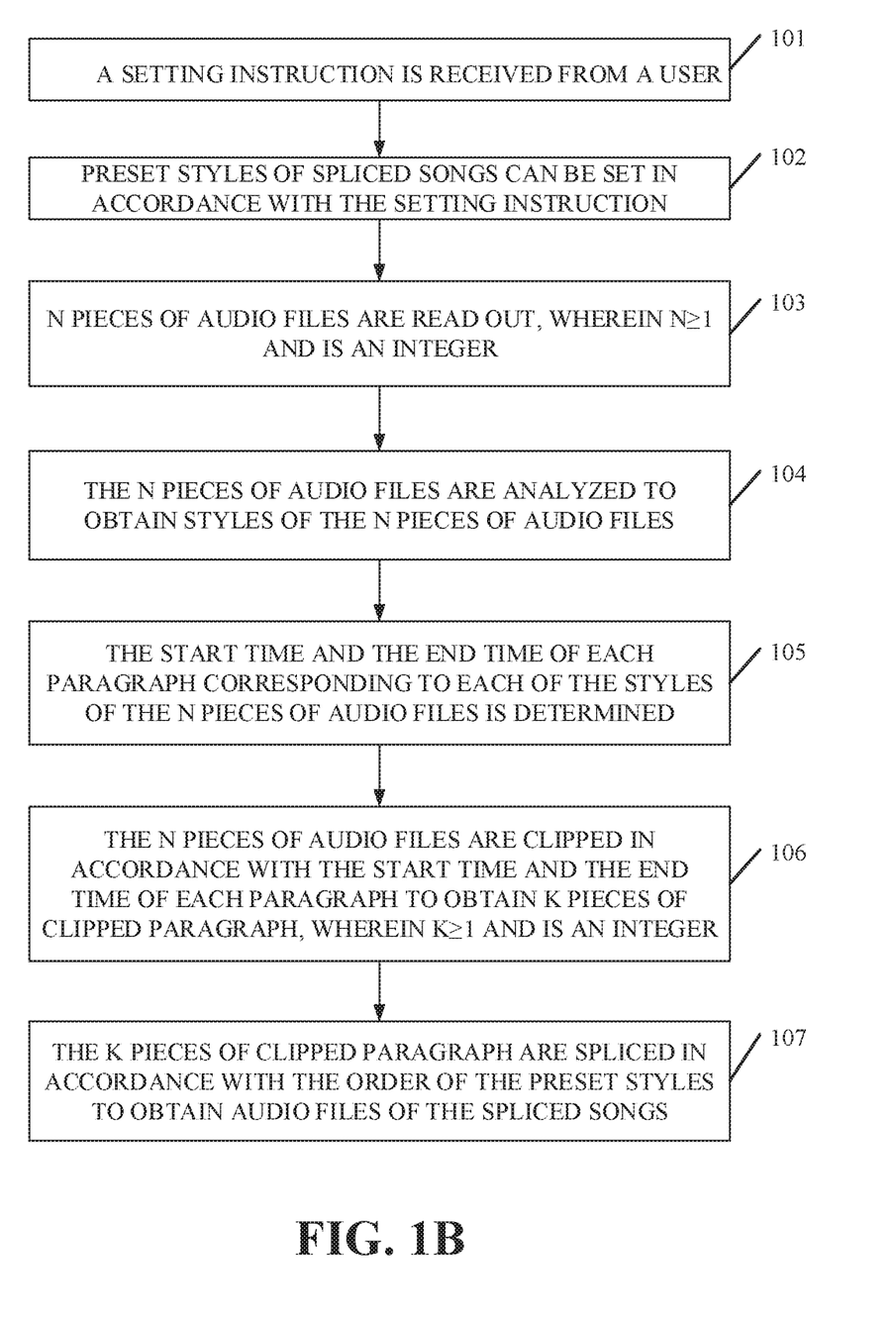
FIG. 1B is a schematic flow chart illustrating a method for processing audio files according to a second method implementation of the present disclosure.

FIG. 1B is a schematic flow chart illustrating a method for processing audio files according to the second method implementation of the present disclosure. In this implementation, the user can send an instruction to the system side, in which preset styles and/or splice order will be contained. As illustrated in FIG. 1, the process begins at block 101.

At block 101, a setting instruction is received from a user.

The setting instruction received is sent from the user. The user can operate on a preset style song processing device so as to generate the instruction, for example, the user can operate via buttons or a touch screen.

At block 102, preset styles of audio files of spliced songs can be set in accordance with the setting instruction.

At block 103, N pieces of audio files are read out, wherein N≥1 and is an integer. As one implementation, the N pieces of audio files can be read out in accordance with the preset styles so as to simplify the subsequent operations such as style matching.

At block 104, the N pieces of audio files are analyzed to obtain styles of the N pieces of audio files. In one implementation, the audio files are analyzed to obtain the style of each paragraph included in the N pieces of audio files.

For example, a plurality of styles among the preset styles can be involved in one song. The style(s) of each song can be analyzed and determined in accordance with the preset styles, for example, through comparison with the preset styles. For example, male voice, female voice, chorus, and rap can be involved in a given song.

At block 105, the start time and the end time of each paragraph corresponding to each of the styles of the N pieces of audio files is determined.

In one implementation, the styles of the N pieces of audio files can include rock music, folk music, country music; based on this, among paragraphs corresponding to the styles of the N pieces of audio files, the start time and the end time of a paragraph corresponding to rock music, the start time and the end time of a paragraph corresponding to folk music, and the start time and the end time of a paragraph corresponding to country music can be determined.

As another implementation, at block 105, only the start time and the end time of the paragraphs corresponding to one or more preset styles will be determined so as to save processing time and simplify operation.

At block 106, the N pieces of audio files are clipped in accordance with the start time and the end time of each paragraph, so as to obtain K pieces of clipped paragraph, wherein K≥1 and is an integer; among which, each clipped paragraph has a corresponding style.

At block 107, all or part of the K pieces of clipped paragraph are spliced in accordance with a predetermined order to obtain audio files of the spliced songs.

As one implementation, all or part of the K pieces of clipped paragraph can be spliced in accordance with the order of the preset styles, such as in chronological order (for example, the sequence of input of each preset style by user), in a random order, or in order set and indicated through the instruction by user.

Among the K pieces of clipped paragraph, there can be one or more un-matched clipped paragraph, the style of which does not belong to the preset styles, in other words, does not match with the preset styles; in this case, the un-matched clipped paragraph will not be spliced. This operation can be considered as a style matching process, via which only the style-matched clipped paragraphs will be spliced.

Through the technical schemes described above, the user can choose the preset styles which he or she wants to play, and splicing of audio files can be performed according to the instruction sent by user. The method can be achieved flexibly and user experience can be improved.

Generally, an audio file can include an original part and an accompaniment part. The original part or the accompaniment part can be extracted through separating. Based on this, the start time and the end time of a paragraph determined at block 105 can be obtained with aid of the start time and the end time of the original part or the accompaniment part, which will be described below.

Third Method Implementation

Figure 2:
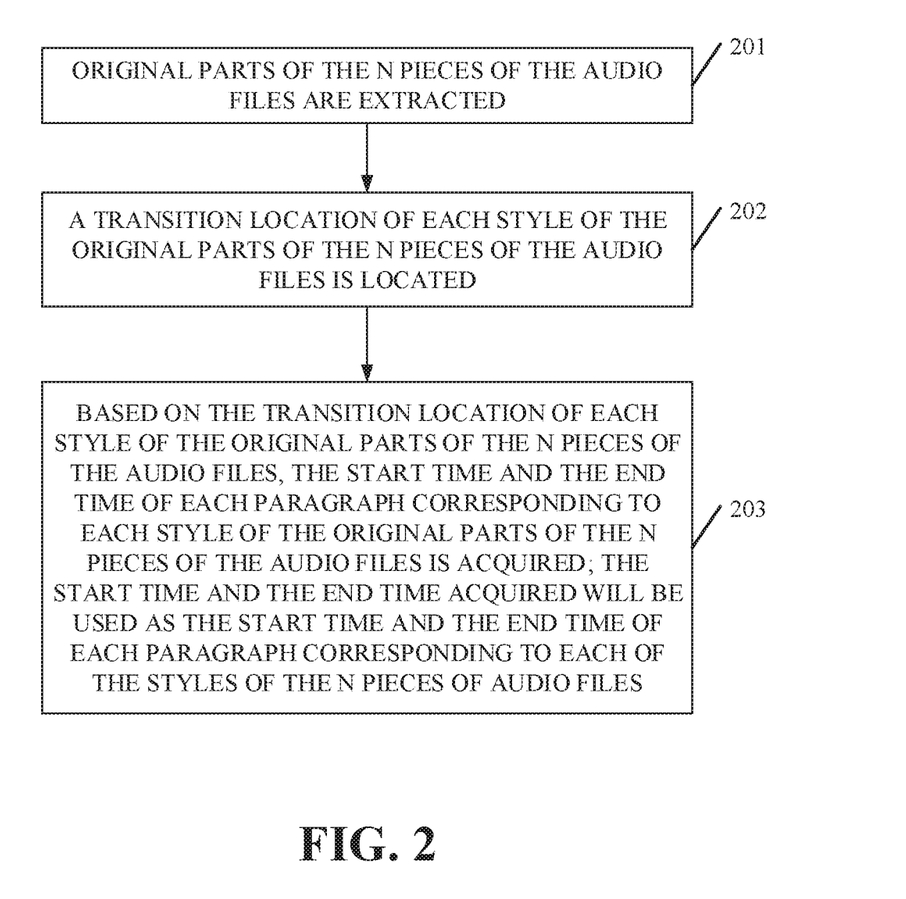
FIG. 2 is a schematic flow chart illustrating a method for processing audio files according to a third method implementation of the present disclosure.

FIG. 2 is a schematic flow chart illustrating a method for processing audio files according to the third method implementation of the present disclosure. In more concrete terms, FIG. 2 illustrates detailed operations at block 105 of FIG. 1B. As illustrated in FIG. 2, the process at block 105 of FIG. 1B can be conducted as follows.

At block 201, original parts of the N pieces of the audio files are extracted.

At block 202, a transition location of each style of the original parts of the N pieces of the audio files is located.

As one implementation, styles of the original parts of the N pieces of the audio files can be recognized so as to obtain a distribution of styles of the original parts of the N pieces of the audio files. For example, the styles of the original parts can be recognized with aid of variations in tunes of voice or voice content, so as to obtain the distribution of styles of the N pieces of the audio files, and then according to the distribution obtained, the transition location of each style of the original parts of the N pieces of the audio files can be obtained. Among which the distribution can include but not limited to locations of paragraphs of different styles, the start time and the end time of paragraphs of different styles, types of different styles, and the like.

At block 203, based on the transition location of each style of the original parts of the N pieces of the audio files, the start time and the end time of each paragraph corresponding to each style of the original parts of the N pieces of the audio files is acquired; the start time and the end time acquired will be used as the start time and the end time of each paragraph corresponding to each of the styles of the N pieces of audio files. The start time and the end time of the paragraph exist between two adjacent transition locations.

Through the technical scheme described above, the original parts of the N pieces of the audio files can be extracted and the transition location of each style of the original parts of the N pieces of the audio files can be located; based on the transition location of each style of the original parts of the N pieces of the audio files, the start time and the end time of each paragraph corresponding to each style of the original parts of the N pieces of the audio files can be acquired, and the start time and the end time acquired will be used as the start time and the end time of each paragraph corresponding to each of the styles of the N pieces of the audio files. Therefore, the start time and the end time of paragraphs of different styles can be obtained and it will be convenient for the subsequent clipping operation.

Fourth Method Implementation

Figure 3:
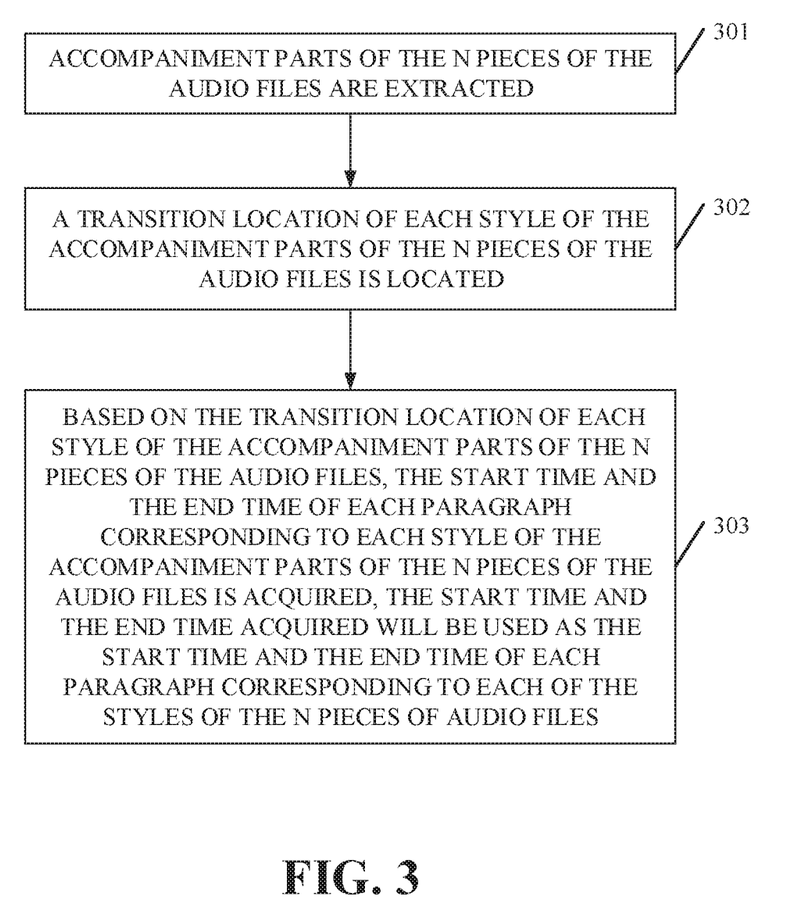
FIG. 3 is a schematic flow chart illustrating a method for processing audio files according to a fourth method implementation of the present disclosure.

FIG. 3 is a schematic flow chart illustrating a method for processing audio files according to the fourth method implementation of the present disclosure. In more concrete terms, FIG. 3 illustrates detailed operations at block 105 of FIG. 1B. As illustrated in FIG. 3, the process performed at block 105 of FIG. 1B can be conducted as follows.

At block 301, accompaniment parts of the N pieces of the audio files are extracted.

At block 302, a transition location of each style of the accompaniment parts of the N pieces of the audio files is located.

Compared with the third method implementation, in this implementation, the styles of the accompaniment parts can be recognized with aid of variations in tunes, so as to obtain the distribution of styles of the N pieces of the audio files, and then according to the distribution obtained, the transition location of each style of the accompaniment parts of the N pieces of the audio files can be obtained. Among which the distribution can include but not limited to locations of paragraphs of different styles, the start time and the end time of paragraphs of different styles, types of different styles, and the like.

At block 303, based on the transition location of each style of the accompaniment parts of the N pieces of the audio files, the start time and the end time of each paragraph corresponding to each style of the accompaniment parts of the N pieces of the audio files is acquired; the start time and the end time acquired will be used as the start time and the end time of each paragraph corresponding to each of the styles of the N pieces of audio files. The start time and the end time of the paragraph exist between two adjacent transition locations.

Through the technical scheme described above, the accompaniment parts of the N pieces of the audio files can be extracted and the transition location of each style of the accompaniment parts of the N pieces of the audio files can be located; based on the transition location of each style of the accompaniment parts of the N pieces of the audio files, the start time and the end time of each paragraph corresponding to each style of the accompaniment parts of the N pieces of the audio files can be acquired, and the start time and the end time acquired will be used as the start time and the end time of each paragraph corresponding to each of the styles of the N pieces of the audio files. Therefore, the start time and the end time of paragraphs of different styles can be obtained and it will be convenient for the subsequent clipping operation.

Fifth Method Implementation

Figure 4:
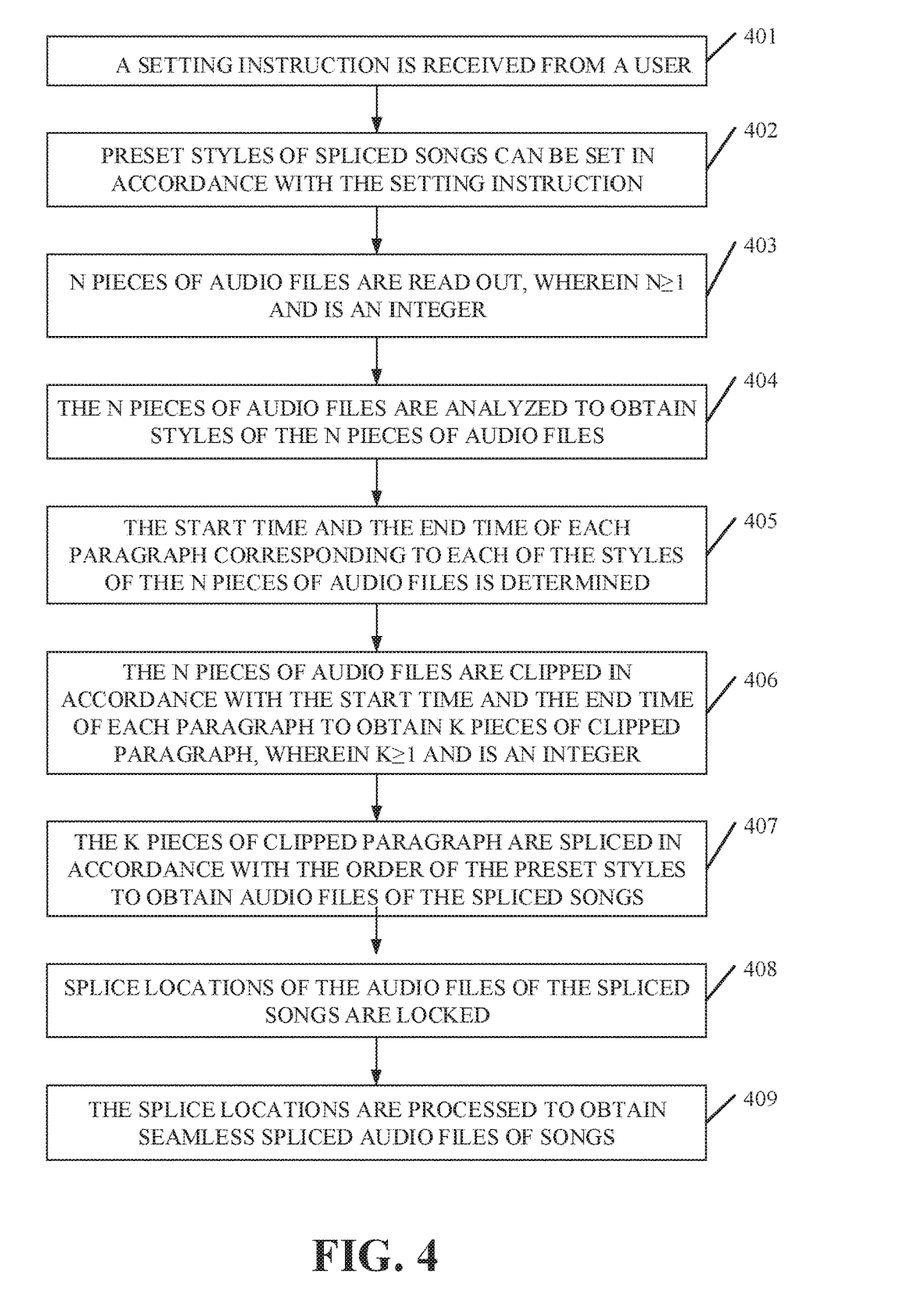
FIG. 4 is a schematic flow chart illustrating a method for processing audio files according to a fifth method implementation of the present disclosure.

FIG. 4 is a schematic flow chart illustrating a method for processing audio files according to the fifth method implementation of the present disclosure. In more concrete terms, in addition to the operations of FIG. 1, FIG. 4 further illustrates subsequent operations of block 107 of FIG. 1B. As illustrated in FIG. 4, the method can begin at block 401.

At block 401, a setting instruction is received from a user.

The setting instruction received is sent from the user. The user can operate on a preset style song processing device so as to generate the setting instruction, for example, the user can operate via buttons or a touch screen.

At block 402, preset styles of audio files of spliced songs can be set in accordance with the setting instruction.

As one implementation, the preset styles can include but not limited to light music, rock music, heavy metal music, fresh music, folk music, rap, Chinese music, English music, vocal music, choral music, country music, and the like. Based on this, the setting manner of the order of the preset styles can be any of the follows: the first song is rock music and the second song is rap; the first sentence is Chinese music and the second sentence is English music; or, the first paragraph is rap and the second paragraph is vocal music; and so on.

At block 403, N pieces of audio files are read out, wherein N≥1 and is an integer.

At block 404, the N pieces of audio files are analyzed to obtain styles of the N pieces of audio files.

For example, a plurality of styles among the preset styles can be involved in one song. The style(s) of each song can be analyzed and determined in accordance with the preset styles, for example, through comparison with the preset styles. For example, male voice, female voice, chorus, and rap can be involved in one song.

At block 405, the start time and the end time of each paragraph corresponding to each of the styles of the N pieces of audio files is determined.

In one implementation, the styles of the N pieces of audio files can include rock music, folk music, country music; based on this, among paragraphs corresponding to the styles of the N pieces of audio files, the start time and the end time of a paragraph corresponding to rock music, the start time and the end time of a paragraph corresponding to folk music, and the start time and the end time of a paragraph corresponding to country music can be determined.

At block 406, the N pieces of audio files are clipped in accordance with the start time and the end time of each paragraph to obtain K pieces of clipped paragraph, wherein K≥1 and is an integer; among which, each clipped paragraph has a corresponding style.

At block 407, all or part of the K pieces of clipped paragraph are spliced in accordance with a predetermined order to obtain audio files of the spliced songs. Among the K pieces of clipped paragraph, there can be one or more un-matched clipped paragraphs, the style of which does not belong to the preset styles, in other words, does not match with the preset styles; in this case, the un-matched clipped paragraph will not be spliced.

As one implementation, the K pieces of clipped paragraph can be spliced in accordance with the order of the preset styles, such as in chronological order of input of each preset style by user, in a random order, or in order set via the instruction by user.

At block 408, splice locations of the audio files of the spliced songs are locked or determined.

In practice, it is better not to show traces of splicing in order to achieve seamless splicing; therefore, it is good to determine splice locations for further treatment.

At block 409, the splice locations are processed to obtain seamless spliced audio files of songs.

As one implementation, the splice locations of the audio files of the spliced songs can be processed in a predetermined manner so as to obtain the seamless spliced audio files. The process can include but not limited to: performing tune adjustment on the splice locations of the spliced audio files of the spliced songs, inserting tunes with similar degrees of variation, and smoothing tunes with large variation at the splice locations.

Through the technical schemes described above, after audio files are being spliced, the spliced audio files obtained can be further processed to get the seamless spliced audio files. Therefore, the user can be provided with better playing effect.

First Device Implementation

Figure 5:
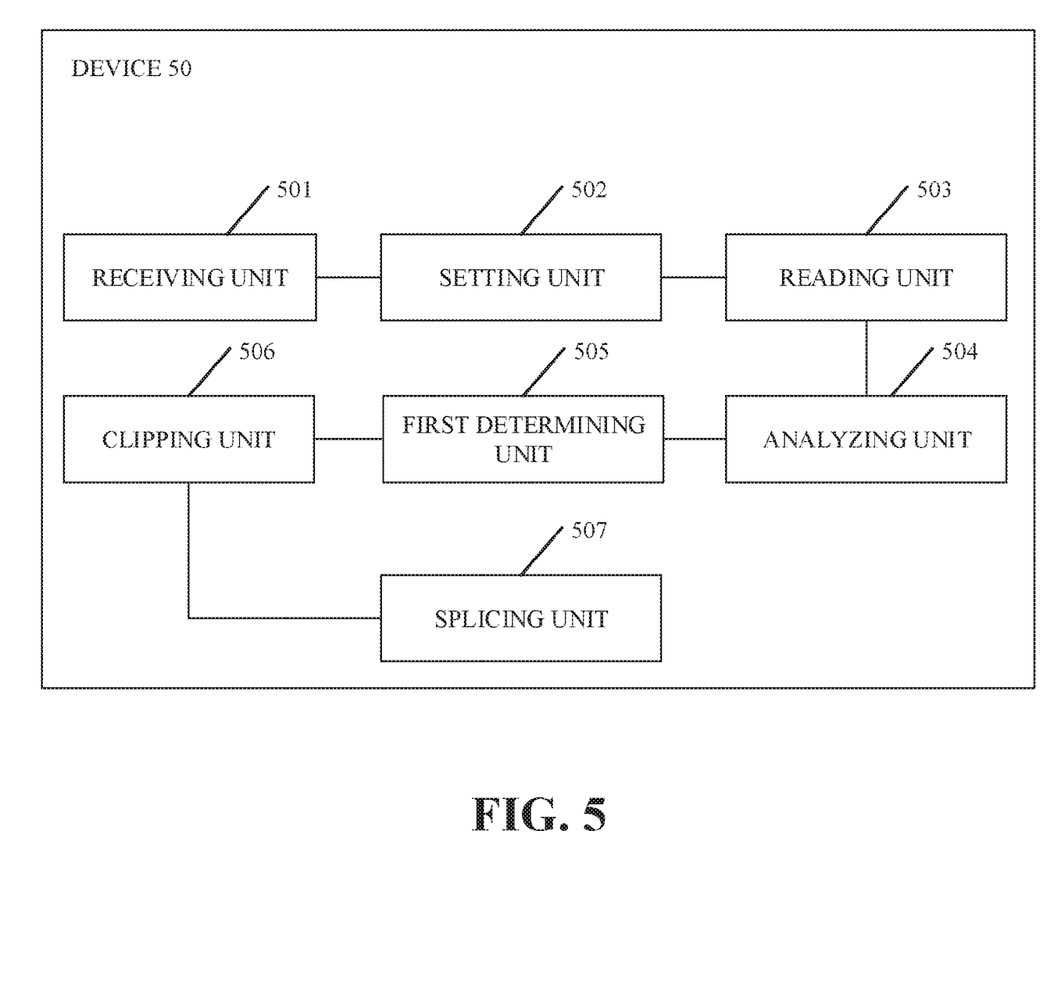
FIG. 5 is a schematic structure diagram illustrating a device for processing audio files according to a first device implementation of the present disclosure.

FIG. 5 is a schematic structure diagram illustrating a device for processing audio files according to the first device implementation of the present disclosure. As illustrated in FIG. 5, a device 50 includes a receiving unit 501 such as a receiver, a setting unit 502 such as a processor, a reading unit 503 such as a reader, an analyzing unit 504 such as an analyzer or processor, a first determining unit 505 such as a processor, a clipping unit 506 such as an editor, and a splicing unit 507 such as an editor, which will be described below in detail.

The receiving unit 501 is configured to receive a setting instruction from a user.

The setting instruction received by the receiving unit 501 is sent from the user. The user can operate on a preset style song processing device so as to generate the instruction, for example, the user can operate via buttons or a touch screen.

The setting unit 502 is configured to set preset styles of spliced songs in accordance with the setting instruction.

As one implementation, the preset styles can include but not limited to light music, rock music, heavy metal music, fresh music, folk music, rap, Chinese music, English music, vocal music, choral music, country music, and the like. Based on this, the setting manner of the order of the preset styles can be any of the follows: the first song is rock music and the second song is rap; the first sentence is Chinese music and the second sentence is English music; or, the first paragraph is rap and the second paragraph is vocal music; and so on.

The reading unit 503 is configured to read out N pieces of audio files, wherein N≥1 and is an integer.

For example, songs that will be used as the N pieces of audio files can be pre-selected by the reading unit 503 in accordance with the preset styles.

The analyzing unit 504 is configured to analyze the N pieces of audio files to obtain styles of the N pieces of audio files.

The analyzing unit 504 can analyze the N pieces of audio files to obtain styles of the N pieces of audio files. For example, a plurality of styles among the preset styles can be involved in one song. The style(s) of each song can be analyzed and determined in accordance with the preset styles. For example, male voice, female voice, chorus, and rap can be involved in one song.

The first determining unit 505 is configured to determine the start time and the end time of each paragraph corresponding to each of the styles of the N pieces of audio files.

In one implementation, the first determining unit 505 can determine the start time and the end time of a paragraph corresponding to any of the styles of the N pieces of audio files. For example, the styles of the N pieces of audio files can include rock music, folk music, country music; based on this, among paragraphs corresponding to the styles of the N pieces of audio files, the start time and the end time of a paragraph corresponding to rock music, the start time and the end time of a paragraph corresponding to folk music, and the start time and the end time of a paragraph corresponding to country music can be determined.

The clipping unit 506 is configured to clip the N pieces of audio files in accordance with the start time and the end time of each paragraph to obtain K pieces of clipped paragraph, wherein K≥1 and is an integer, among which, each clipped paragraph has a corresponding style.

The splicing unit 507 configured to splice all or part of the K pieces of clipped paragraph in accordance with a predetermined order to obtain audio files of the spliced songs. Among the K pieces of clipped paragraph, there can be one or more clipped paragraphs, that is, un-matched clipped paragraph, the style of which does not belong to the preset styles, in other words, does not match with the preset styles; in this case, the un-matched clipped paragraph will not be spliced.

As one implementation, the splicing unit 507 can splice the K pieces of clipped paragraph in accordance with the order of the preset styles, such as in chronological order, in a random order, or in order set by user.

Through the technical scheme described above, the device can splice audio files according to preset styles set by user or system.

Figure 6:
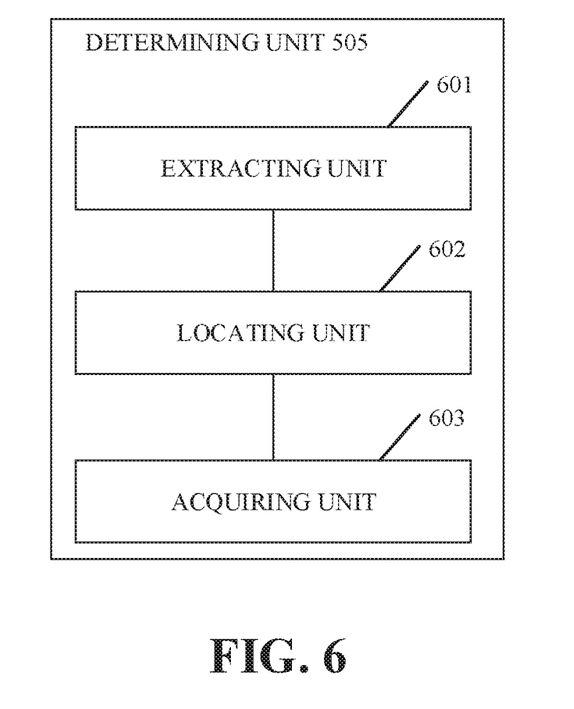
FIG. 6 is a schematic structure diagram illustrating a determining unit of the device for processing audio files.

FIG. 6 is a schematic structure diagram illustrating the determining unit of the device for processing audio files, for example, the determining unit illustrated in FIG. 6 can be a possible implementation of the first determining unit 505 illustrated in FIG. 5. As illustrated in FIG. 6, the determining unit includes an extracting unit 601, a locating unit 602, and an acquiring unit 603, which can be integrated in a processor.

The extracting unit 601 is configured to extract original parts of the N pieces of the audio files.

Generally, an audio file can include an original part and an accompaniment part and the extracting unit 601 can extract the original part. The original part can be extracted through separating the original part and the accompaniment part of the audio file.

The locating unit 602 is configured to locate a transition location of each style of the original parts of the N pieces of the audio files.

As one implementation, the first locating unit 602 can locate or determine the transition location of each style of the original parts. For example, styles of the original parts of the N pieces of the audio files can be recognized so as to obtain a distribution of styles of the original parts of the N pieces of the audio files. For example, the styles of the original parts can be recognized with aid of variations in tunes of voice or voice content, so as to obtain the distribution of styles of the N pieces of the audio files and then according to the distribution obtained, the transition location of each style of the original parts of the N pieces of the audio files can be obtained. Among which the distribution can include but not limited to locations of paragraphs of different styles, the start time and the end time of paragraphs of different styles, types of different styles, and the like.

The acquiring unit 603 is configured to acquire, based on the transition location of each style of the original parts of the N pieces of the audio files, the start time and the end time of each paragraph corresponding to each style of the original parts of the N pieces of the audio files; the start time and the end time of each paragraph corresponding to each style of the original parts will be used as the start time and the end time of each paragraph corresponding to each of the styles of the N pieces of audio files.

As one implementation, for each of the styles of the original parts of the N pieces of the audio files, the start time and the end time of a paragraph corresponding thereto can be acquired by the acquiring unit 603 based on the transition location of the paragraph, and the start time and the end time acquired will be used as the start time and the end time of each paragraph corresponding to each of the styles of the N pieces of audio files. The start time and the end time of the paragraph exist between two adjacent transition locations.

Similarly, the extracting unit 601 can be configured to extract accompaniment parts of the N pieces of the audio files; the locating unit 702 can be configured to locate a transition location of each style of the accompaniment parts of the N pieces of the audio files; and the acquiring unit 703 can be configured to acquire, based on the transition location of each style of the accompaniment parts of the N pieces of the audio files, the start time and the end time of each paragraph corresponding to each style of the accompaniment parts of the N pieces of the audio files. The start time and the end time of each paragraph corresponding to each style of the accompaniment parts will be used as the start time and the end time of each paragraph corresponding to each of the styles of the N pieces of audio files.

Through the structure illustrated in FIG. 6, the start time and the end time of paragraphs of different styles can be obtained and it will be convenient for the subsequent clipping operation.

Second Device Implementation

Figure 7:
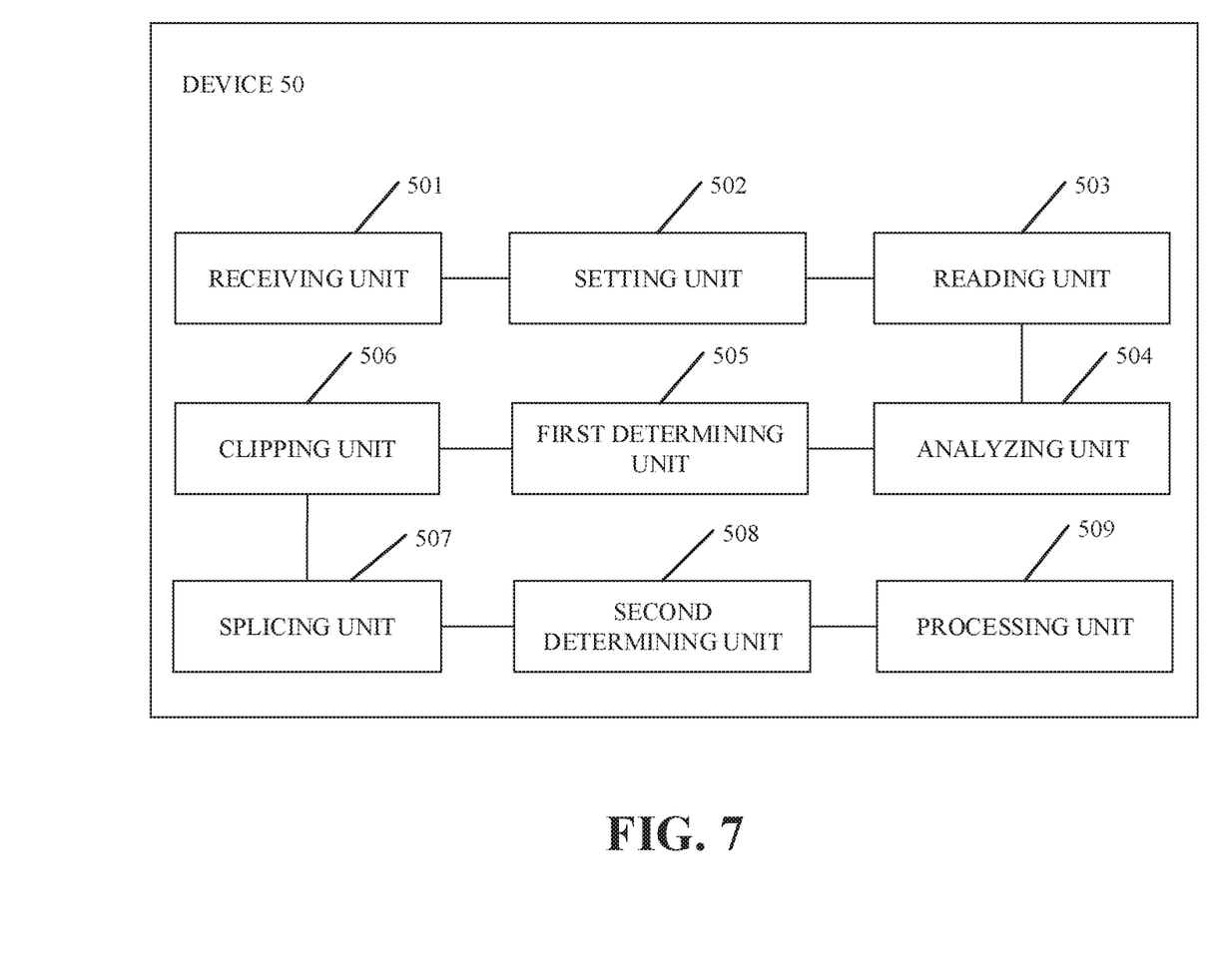
FIG. 7 is a schematic structure diagram illustrating a device for processing audio files according to a second device implementation of the present disclosure.

FIG. 7 is a schematic structure diagram illustrating a device for processing audio files according to a second device implementation of the present disclosure. The receiving unit 501, the setting unit 502, the reading unit 503, the analyzing unit 504, the first determining unit 505, the clipping unit 506, and the splicing unit 507 illustrated in FIG. 8 is the same as those illustrated in FIG. 5 and will not be described here again.

The device of FIG. 8 further include a second determining unit 508 such as a processor, which is configured to determine splice locations of the audio files of the spliced songs.

In practice, it is better not to show traces of splicing in order to achieve seamless splicing; therefore, the second determining unit 508 can be adopted to determine splice locations for further treatment.

The device of FIG. 8 further include a processing unit 509 such as a processor, which is configured to process the splice locations to obtain seamless spliced audio files of songs.

As one implementation, the processing unit 509 can process the splice locations of the audio files of the spliced songs in a predetermined manner so as to obtain the seamless spliced audio files. The process can include but not limited to: performing tune adjustment on the splice locations of the spliced audio files of the spliced songs, inserting tunes with similar degrees of variation, and smoothing tunes with large variation at the splice locations.

Through technical schemes of the present implementation, the receiving unit 501 can receive the setting instruction from the user; the setting unit 502 can set preset styles of spliced songs in accordance with the setting instruction; the reading unit 503 can read out N pieces of audio files, wherein N≥1 and is an integer; the analyzing unit 504 can analyze the N pieces of audio files to obtain styles of the N pieces of audio files; the first determining unit 505 can determine the start time and the end time of each paragraph corresponding to each of the styles of the N pieces of audio files; the clipping unit 506 can clip the N pieces of audio files in accordance with the start time and the end time to obtain K pieces of clipped paragraph, wherein K≥1 and is an integer; the splicing unit 507 can splice the K pieces of clipped paragraph in accordance with the order of the preset styles to obtain spliced audio files of the spliced songs, the second determining unit 508 can determine splice locations of the audio files of the spliced songs, and the processing unit 509 can process the splice locations to obtain seamless spliced audio files of songs. Therefore, the audio files of the spliced songs can be processed to obtain the seamless spliced audio files.

Third Device Implementation

Figure 8:
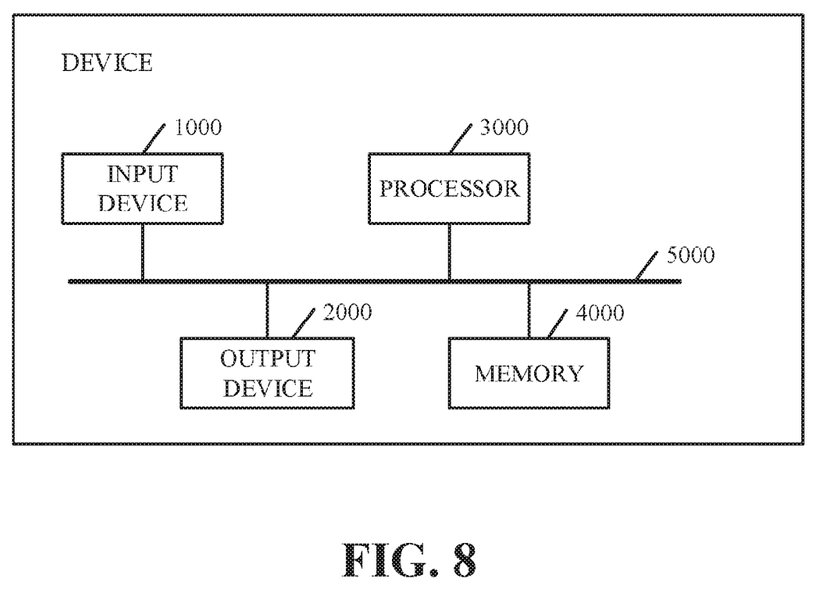
FIG. 8 is a schematic structure diagram illustrating a device for processing audio files according to a third device implementation of the present disclosure.

FIG. 8 is a schematic structure diagram illustrating a device for processing audio files according to a third device implementation of the present disclosure. As illustrated in FIG. 8, the device according to this implementation includes at least one input device 1000, at least one output device 2000, at least one processor 3000 such as a CPU, and a memory 4000. The input device 1000, the output device 2000, the processor 3000, and the memory 4000 can be coupled via a bus 5000.

The input device 1000 can be a touch panel, a generic PC, a LCD, or a touch screen.

The memory 4000 can be a high speed RAM memory or a non-volatile memory such as disk storage. The memory 4000 is configured to store a set of program code, the input device 1000, the output device 2000, and the processor 3000 is configured to invoke the program code stored in the memory 4000 to perform the following process.

The processor 3000 is configured to receive a setting instruction from a user.

The processor 3000 is further configured to set preset styles of audio files of spliced songs in accordance with the setting instruction.

As one implementation, the preset styles can include but not limited to light music, rock music, heavy metal music, fresh music, folk music, rap, Chinese music, English music, vocal music, choral music, country music, and the like.

The processor 3000 is further configured to read out N pieces of audio files, wherein N≥1 and is an integer.

The processor 3000 is further configured to analyze the N pieces of audio files to obtain styles of the N pieces of audio files.

The processor 3000 is further configured to determine the start time and the end time of each paragraph corresponding to each of the styles of the N pieces of audio files.

The processor 3000 is further configured to clip the N pieces of audio files in accordance with the start time and the end time of each paragraph to obtain K pieces of clipped paragraph, wherein K≥1 and is an integer, and splice all or part of the N pieces of audio files to obtain spliced audio files.

The processor 3000 is further configured to determine splice locations of the spliced audio files of the spliced songs.

The processor 3000 is further configured to process the splice locations of the spliced audio files of the spliced songs so as to obtain seamless spliced audio files of songs.

In some implementations, the processor 3000 is further configured to extract original parts of the N pieces of the audio files.

The processor 3000 is further configured to locate a transition location of each style of the original parts of the N pieces of the audio files.

The processor 3000 is further configured to acquire, based on the transition location of each style of the original parts of the N pieces of the audio files, the start time and the end time of each paragraph corresponding to each style of the original parts of the N pieces of the audio files; the start time and the end time acquired will be used as the start time and the end time of each paragraph corresponding to each of the styles of the N pieces of audio files.

In some other implementations, the processor 3000 is further configured to extract accompaniment parts of the N pieces of the audio files.

The processor 3000 is further configured to locate a transition location of each style of the accompaniment parts of the N pieces of the audio files.

The processor 3000 is further configured to acquire, based on the transition location of each style of the accompaniment parts of the N pieces of the audio files, the start time and the end time of each paragraph corresponding to each style of the accompaniment parts of the N pieces of the audio files; the start time and the end time acquired will be used as the start time and the end time of each paragraph corresponding to each of the styles of the N pieces of audio files.

In practice, the input device 1000, the output device 2000, and the processor 3000 can perform the method for processing audio files described above with refer to FIG. 1-FIG. 4 as well as the device for processing audio files described above with refer to FIG. 5-FIG. 8.

Modules or sub-modules used in the implementations of the present disclosure can be achieved via General Integrated Circuit such as CPU or Application Specific Integrated Circuit.

Sequence of the steps of the method according to the implementations of the present disclosure can be adjusted, merged, or deleted according to actual needs.

Similarly, units of the device according to the implementations of the present disclosure can be merged, divided, or deleted according to actual needs.

Those skilled in the art should be noted that, all or part of the procedures of the method described above can be implemented through computer program instructed hardware. The computer program can be stored in a computer readable storage medium, when executed, the computer program adapted to perform the procedures of the method. Among which the storage medium can be disk, CD, Read-Only Memory (ROM), Random Access Memory (RAM), and so on.

The foregoing descriptions are merely exemplary implementations rather than restriction of the present disclosure. Various modifications and alterations can be made to the present disclosure for those skilled in the art. Any modification, equivalent substitution, improvement or the like made within the spirit and principle of the present disclosure shall fall into the protection scope thereof.

What is claimed is:

1. A method for processing audio files, comprising:
   receiving a setting instruction from a user;
   setting preset types of spliced songs in accordance with the setting instruction;
   reading out N audio files, wherein N≥1 and is an integer;
   analyzing the N audio files to obtain types of the N audio files;
   determining, in each of the N audio files, a start time and an end time of each segment corresponding to each of the types of the N audio files, comprising
   extracting predetermined parts of the N audio files, wherein the predetermined parts are original voice parts or accompaniment parts;
   locating a transition location of each type of the predetermined parts of the N audio files;
   acquiring a first start time and a first end time of each segment corresponding to each type of the predetermined parts of the N audio files; and
   using the first start time and the first end time of each segment corresponding to each type of the predetermined parts of the N audio files as the start time and the end time of each segment corresponding to each of the types of the N audio files;
   clipping the N audio files in accordance with the start time and the end time of each segment corresponding to each of the types of the N audio files to obtain K clipped segments, wherein K≥1 and is an integer; and
   splicing all or part of the K clipped segments in accordance with an order of the preset types to obtain spliced audio files of the spliced songs.

2. The method of claim 1, wherein after splicing all or part of the K lipped segments in accordance with an order of the preset types to obtain the audio files of the spliced songs, the method further comprises:
   determining splice locations of the spliced audio files of the spliced songs; and
   processing the splice locations to obtain seamless spliced audio files of the spliced songs.

3. The method of claim 1, wherein reading out N audio files comprises:
   reading out N audio files in accordance with the preset types.

4. A device for processing audio files, comprising:
   a receiving unit, configured to receive a setting instruction from a user;
   a setting unit, configured to set preset types of spliced songs in accordance with the setting instruction;
   a reading unit, configured to read out N audio files, wherein N≥1 and is an integer;
   an analyzing unit, configured to analyze the N audio files to obtain types of the N audio files;
   a first determining unit, configured to determine, in each of the N audio files, a start time and an end time of each segment corresponding to each of the types of the N audio files by:
   extracting predetermined parts of the N audio files, wherein the predetermined parts are original voice parts or accompaniment parts
   locating a transition location of each type of the predetermined parts of the N audio files;
   acquiring a first start time and a first end time of each segment corresponding to each type of the predetermined parts of the N audio files; and
   using the first start time and the first end time of each segment corresponding to each type of the predetermined parts of the N audio files as the start time and the end time of each segment corresponding to each of the types of the N audio files;
   a clipping unit, configured to clip the N audio files in accordance with the start time and the end time of each segment corresponding to each of the types of the N audio files to obtain K clipped segments, wherein K≥1 and is an integer; and
   a splicing unit, configured to splice all or part of the K clipped segments in accordance with an order of the preset types to obtain spliced audio files of the spliced songs.

5. The device of claim 4, further comprising:
   a second determining unit, configured to determine splice locations of the spliced audio files of the spliced songs; and
   a processing unit, configured to process the splice locations to obtain seamless spliced audio files of the spliced songs.

6. A method for processing audio files, comprising:
   reading out at least one audio file;
   analyzing the at least one audio file to obtain types of segments of the at least one audio file;
   determining a start time and an end time of at least one segment when a type of the at least one segment belongs to preset type, comprising
   extracting predetermined parts of each of the at least one audio file, wherein the predetermined parts are original voice parts or accompaniment parts;
   locating a transition location of each type of the predetermined parts;
   acquiring a first start time and a first end time of a segment corresponding to each type of the predetermined parts based on the transition location of each type; and
   using the first start time and the first end time of the segment corresponding to each type of the predetermined parts as the start time and the end time of the at least one segment;
   clipping the at least one audio file in accordance with the start time and the end time of each segment to obtain at least one clipped segment; and
   splicing the at least one clipped segment to obtain spliced audio files.

7. The method of claim 6, wherein before reading out at least one audio file, further comprising:
   receiving a setting instruction comprising the preset types from a user; and
   acquiring the preset types comprised in the setting instruction.

8. The method of claim 7, wherein the setting instruction further comprises a splice order, and splicing the at least one clipped segment to obtain spliced audio files comprises:
   splicing the at least one clipped segment in accordance with the splice order to obtain the spliced audio files.

9. The method of claim 6, wherein splicing the at least one clipped segment to obtain spliced audio files comprises:
   splicing the at least one clipped segment in accordance with a predetermined order to obtain the spliced audio files, wherein the predetermined order comprises at least one of a random order and a sequence of input of each preset types comprised in the preset types of a user.

10. The method of claim 6, wherein after splicing the at least one clipped segment to obtain spliced audio files, the method further comprises:

determining splice locations of the spliced audio files; and
processing the splice locations to obtain seamless spliced audio files.

11. The method of claim 10, wherein processing the splice locations comprises at least one of:
performing tune adjustment on the splice locations;
inserting tunes with similar variation to the splice locations; and
smoothing tunes with large variation at the splice locations.

* * * * *